Sept. 28, 1965 W. J. ASKINS 3,208,501
BALLAST FILLED PNEUMATIC TIRE CONSTRUCTION
Filed Dec. 11, 1963 2 Sheets-Sheet 1
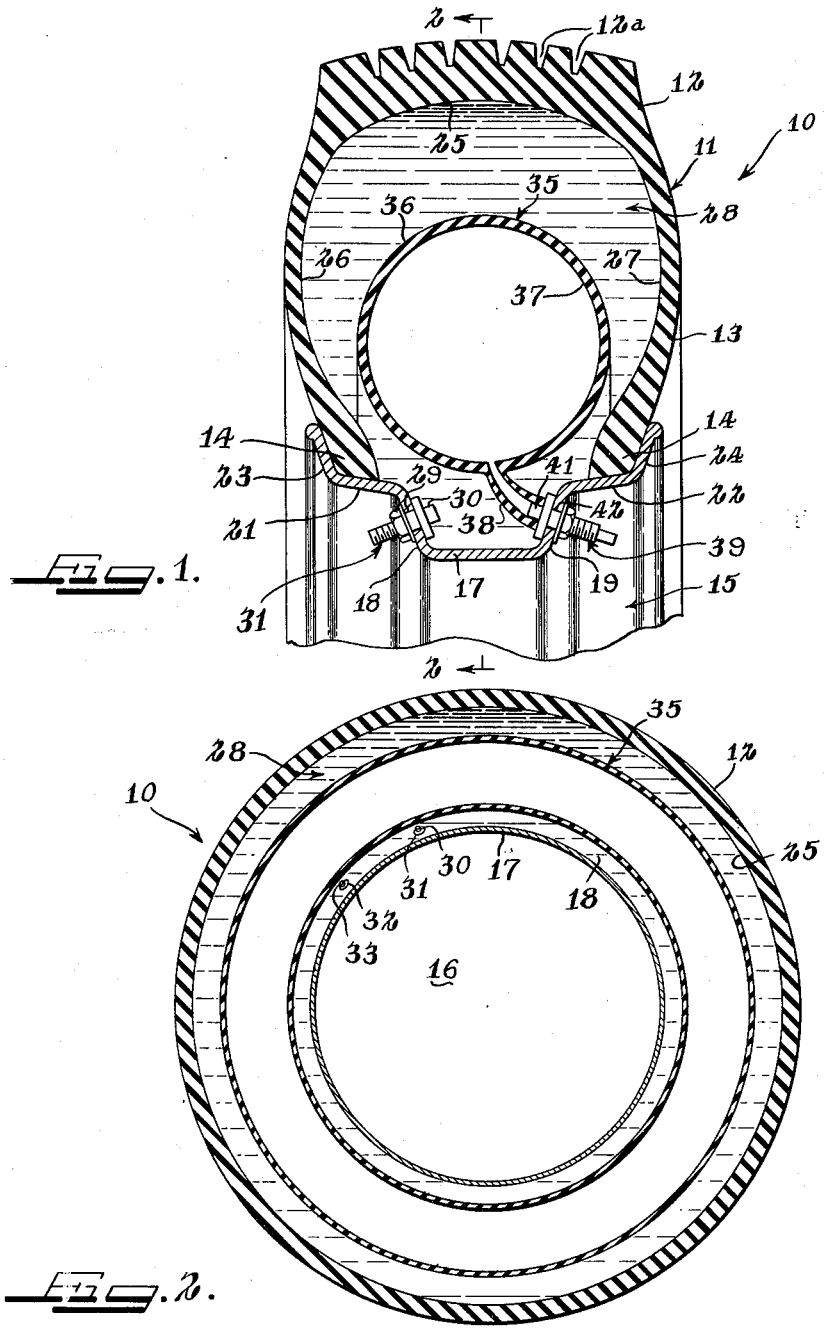
INVENTOR
WILLIAM J. ASKINS INVENTOR
William J. Askins
Ronald C. Kamp
Atty.

United States Patent Office 3,208,501
Patented Sept. 28, 1965

3,208,501
BALLAST FILLED PNEUMATIC TIRE
CONSTRUCTION
William J. Askins, Libertyville, Ill., assignor to The
Frank G. Hough Co., a corporation of Illinois
Filed Dec. 11, 1963, Ser. No. 331,336
3 Claims. (Cl. 152—330)

This invention relates to ballast filled pneumatic tires in general, and more particularly to a pneumatic tire construction for use with a ballast of the solid, dry type.

This application is a continuation-in-part of applicant's copending application Serial Number 172,626, filed February 12, 1962, and now abandoned.

The addition of ballast to the tires of vehicles such as tractors and the like, can be advantageous in that the weight of the ballast increases the tractive effort of the vehicle. The use of a ballast of the dry, solid type has been found to be particularly desirable because it will "fluff" or absorb air as the tire is rotated thereby distributing itself evenly throughout the tire. The even distribution of the ballast material is important to prevent an unbalanced condition as the tire is rotated. However, it has been found that the volume of the tire casing must be filled to 80 to 97 percent of its capacity with the solid, dry ballast in order to achieve a balanced condition. That is, when less than 80 percent of the tire volume is filled or occupied, the ballast material will not fluff or absorb air as it does otherwise when the tire is rotated. The result of this underfilling is that lumps or masses of the ballast material remained packed against the outer wall of the tire thereby unbalancing the tire and creating vibrations and a lopping action. In addition, these lumps or masses of the ballast material tend to slide along the interior wall of the tire generating excessive heat due to friction and result in a loss of power.

In the operation of a particular machine which utilizes ballast, it is often desirable or necessary to vary the weight of the ballast. For example, engine wear, change in compression ratio of the engine, a change in tire design or size, or a change in the condition of the surface over which the vehicle is being operated may make it desirable to change the weight of ballast in the tire.

One means of achieving a decrease in the weight of ballast while simultaneously maintaining the required minimum fill is to use a ballast of a different density. However, to vary the density of the ballast material, all of the ballast material must first be removed from the tire and replaced with a ballast of a different density. Varying the density by withdrawing all of the ballast and replacing it with a material of a different density has obvious disadvantage.

It is, therefore, an object of the present invention to provide a pneumatic tire construction wherein the weight of ballast in the tire can be varied throughout a wide range without changing the density of the ballast material.

Another object of the present invention is to provide a means for permitting a variation of ballast weight within a pneumatic tire which will also regulate or control the firmness of the tire.

Other objects and many of the attendant advantages of the present invention will become more readily apparent upon a perusal of the following specification and drawings in which:

FIGURE 1 is a transverse cross-sectional view of a pneumatic tire assembly illustrating the subject invention with a minimum weight of ballast material;

FIGURE 2 is a longitudinal cross-sectional view taken on line 2—2 of FIGURE 1;

Figure 3:
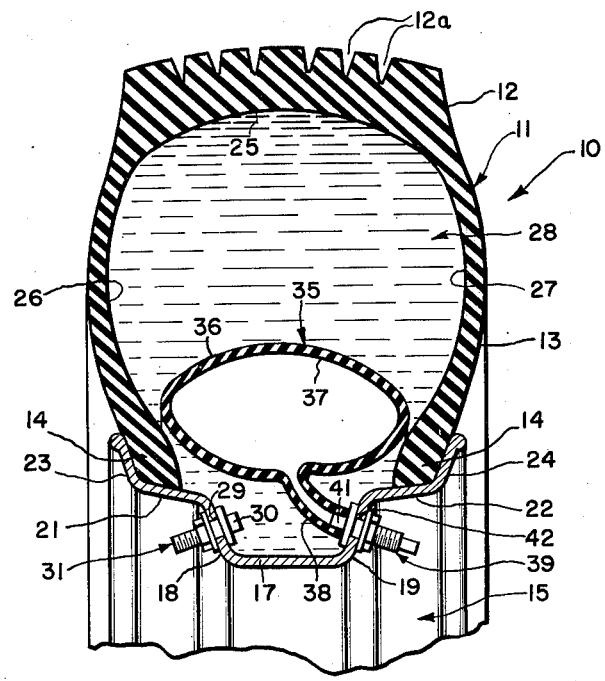
FIGURE 3 is a transverse cross-sectional view of a pneumatic tire assembly, similar to FIGURE 1, showing the tire with an intermediate amount of ballast material.

The illustrated embodiment is the preferred embodiment but it is understood that changes can be made by one skilled in the art without departing from the spirit and scope of the present invention.

Referring to the drawings, the pneumatic tire assembly 10 comprises a tubeless tire of standard construction having a flexible casing 11 which includes a bottom tread portion 12 having tread surfaces 12a, side wall portions 13 and bead portions 14 for mounting the tire casing 11 on a rim 15 having a central opening 16, best shown in FIGURE 2. Rim 15 has a drop center portion which includes a mid portion 17 and outwardly extending portions 18 and 19 at each end, best shown in FIGURE 1. Extending from the outward portions 18 and 19 are the bead portions of the rim 15 that include extending portions 21 and 22 connected to the outwardmost portions 23 and 24. Bead portions 14 of the tire are mounted in the complementary portions of the rim 15 in a conventional manner, as shown in FIGURE 1, to define a closed inner chamber 28 that includes the inside surfaces of the rim portions 17, 18, 19, 21 and 22 and the substantially U-shaped wall of the tire casing, namely the inner side walls 26 and 27 connected to inner wall 25 of the tread portion 12.

A pair of openings 29 in the rim portion 18 provide assembly mounting of valves 31 and 32 of standard construction that permit communication from the closed chamber 28 to the atmosphere or any attached device. These attached valves 31 and 32 include inner portions 30 and 33, as shown in FIGURE 2, only valve 31 and its inner portion 30 being shown in FIGURE 1.

A secondary chamber is provided within the closed chamber 28, the secondary chamber being formed by a separate inner tube or casing 35 which is both flexible and expandable. A neck portion 38 extending from one point of the casing 35 is attached to another valve 39 at its inner portion 41 and mounted in an opening 42 in portion 19 of the rim 15 as shown in FIGURE 1. The valve 39 provides controlled inflation and deflation of the casing 35 through entrance and removal of a pressurizing medium or gas, such as air. Further the connection of the neck portion 38 to the valve 39 at its inner portion 41 is sufficient to withstand flexure of the tire assembly 10 filled with ballast during movement while mounted on a tractor vehicle axle and further to withstand inertia movement of the suspended ballast and suspension medium in the closed chamber 28 without becoming disconnected.

The ballast material is contained within the closed chamber 28, the volume of which is controlled by the degree of inflation of the inner casing 35. That is, the volume of the chamber 28 is largest when the inner casing 35 is completely deflated and smallest when the inner casing 35 is inflated to full capacity. The closed chamber 28 is filled with a mixture of ballast and a gas, such as air, and the inner casing 35 is filled, if at all, with a gas only. The ballast material is of the dry, solid type which generally is composed of a finely powdered organic or inorganic material, such as barium sulfate. The material must be so ground and pulverized that upon agitation or turning within the tire, it will absorb gas and, in effect, become air borne. Generally, any solid which is pulverized to 100 mesh size or finer will absorb air when agitated. Thus, a suitable ballast material would consist of barium surfate powdered to 100 mesh or finer, such as disclosed in U.S. Patent No. 2,884,039, for example.

The ballast is placed in the chamber 28, in a manner well known in the art, through one of the valves 31 and 32 by entraining it in a stream of gas, such as air, and allowing the ballast to settle out. The excess gas is permitted to escape through the other of the valves 31 and 32. Both valves are located or positioned near the top of the tire during the filling operation. When the ballast is to be removed both valves 31 and 32 are positioned at the bottom of the tire and a gas under pressure is admitted to one of the valves 31 and 32. The ballast material is removed from the chamber 28 by being entrained to the stream of gas escaping from the other of the valves 31 and 32.

Figure 4:
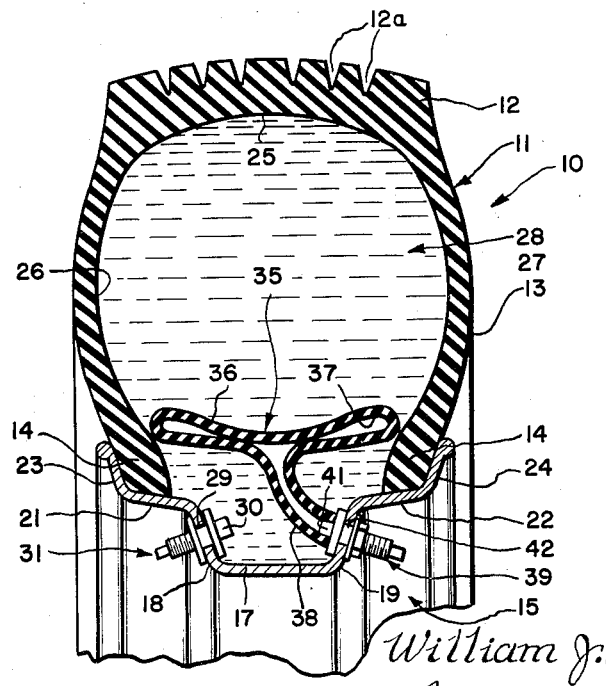
FIGURE 4 is a transverse cross-sectional view, similar to FIGURES 1 and 3, showing the tire with a maximum amount of ballast material.

If the maximum weight of ballast is desired, the inner casing 35 is completely deflated or flattened, and the chamber 28 of the tire casing 11 is filled with ballast to achieve a condition as illustrated in FIGURE 4. Should it then be necessary to decrease the ballast weight, a portion of the ballast material is withdrawn and the inner casing 11 is inflated decreasing the volume of chamber 28 until the ballast material remaining in the tire casing 11 occupies at least 80 percent of the chamber 28, as shown in FIGURE 3.

Whther the weight of ballast is to be increased or decreased, the desired change can be easily and quickly effected by simply adding or withdrawing ballast material and varying the size of the chamber 28 by means of the inner casing 35 to compensate for the change in amount of ballast material.

It can be appreciated, therefore, that the present invention provides a means for varying the weight of ballast in a vehicle tire, while maintaining the proper proportion or percent of ballast material, without the need of changing the density of the ballast material.

It will be understood that various changes in the details, material, steps and arrangements of parts, which have been described and illustrated in order to explain the nature of the invention, may be made by those skilled in the art within the principle and scope of the invention as expressed in the appended claims.

I claim:

1. A tire construction capable of providing a variable ballast weight comprising, a rim, a tire casing mounted on said rim and defining therewith a closed chamber, a ballast material of the dry, solid type which requires a minimum volume concentration to absorb gas as a mixture when agitated, said ballast material being within said chamber, said chamber containing a substantial amount of gas, first valve means for permitting insertion and extraction of said ballast material and the gas into and from said chamber, an inner casing capable of being selectively inflated and deflated, said casing being positioned within said chamber, and second valve means for pemitting inflation and deflation of said casing whereby the amount of said ballast material can be increased and decreased while simultaneously maintaining said minimum concentration by respectively increasing and decreasing that portion of said chamber occupied by the ballace and gas by correspondingly deflating and inflating said inner casing.

2. The invention of claim 1, wherein said substantial amount of gas in that portion of said chamber occupied by the ballast and gas provides a gas content of about three percent to twenty percent gas by volume, the balance of that portion of the chamber being ballast material.

3. A tire construction capable of providing a variable ballast weight comprising, a rim, a tire casing mounted on said rim, a closed chamber within said tire casing, a ballast material of the dry, solid type which requires a minimum volume concentration to absorb gas upon agitation, said ballast material being within said chamber, said chamber containing a substantial amount of gas, valve means for permitting the insertion and extraction of said ballast material and gas into and out of said closed chamber, and secondary chamber means within said closed chamber for selectively increasing and decreasing the volume of said closed chamber so as to maintain said minimum volume concentration to said ballast material.

References Cited by the Examiner

UNITED STATES PATENTS

| | | | |
|---|---|---|---|
| 2,244,941 | 6/41 | Degnon | 152—341 |
| 2,334,110 | 11/43 | McMahan | 141—5 |
| 2,401,950 | 6/46 | McMahan | 141—5 |
| 2,884,039 | 4/59 | Hicks | 152—330 |

FOREIGN PATENTS 680,108   10/52   Great Britain.

ARTHUR L. LA POINT, *Primary Examiner.*